United States Patent [19]

Wolf

[11] Patent Number: 4,833,859
[45] Date of Patent: May 30, 1989

[54] COMPOSITE BEAM

[75] Inventor: Johann Wolf, Scharnstein, Austria

[73] Assignee: Johann Wolf GmbH KG, Scharnstein, Austria

[21] Appl. No.: 152,479

[22] Filed: Feb. 5, 1988

[30] Foreign Application Priority Data

Feb. 5, 1987 [AT] Austria ............................ 87101536.8

[51] Int. Cl.⁴ .......................... E04C 3/02; E04C 3/292
[52] U.S. Cl. .................. 52/730; 52/DIG. 6; 52/90; 52/639; 144/41; 411/466
[58] Field of Search .......................... 52/730, DIG. 6; 144/312, 136, 359, 360, 377, 41; 411/457, 461, 466

[56] References Cited

U.S. PATENT DOCUMENTS

| | | | |
|---|---|---|---|
| 705,626 | 7/1902 | Vogel | 411/467 |
| 3,016,586 | 1/1962 | Atkins | 411/466 |
| 3,487,866 | 1/1970 | Mitten | 144/41 |
| 3,494,645 | 2/1970 | Jureit | 411/466 |
| 4,442,649 | 4/1984 | Birckhead et al. | 52/693 |
| 4,476,663 | 10/1984 | Bikales | 52/730 |
| 4,562,683 | 1/1986 | Gottlieb | 52/DIG. 6 |
| 4,710,083 | 12/1987 | Wolf | 411/466 |

FOREIGN PATENT DOCUMENTS 0966362 8/1964 United Kingdom ............... 411/457

*Primary Examiner*—David A. Scherbel
*Assistant Examiner*—Michele A. Van Patten
*Attorney, Agent, or Firm*—Wm. D. Johnston, III

[57] ABSTRACT

A composite beam has round timber sections joined by nail plates, each timber section being edged in accordance with the conical contour of the tree trunk from which it is formed. The timber sections are joined by the nail plates with their tapered ends pointed in the same or in opposite directions, depending on the load requirements. Each nail plate has a front edge, a rear edge and a pair of longitudinal edges, and rows of nails are formed of tongue-shaped punch-outs in the nail plate, with each punch-out being parallel to the longitudinal edges. A step pattern is provided on the front edge and/or the rear edge.

15 Claims, 3 Drawing Sheets

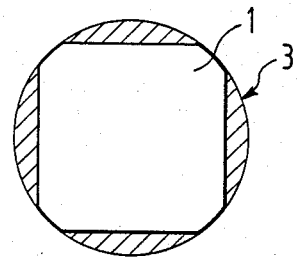
FIG. 1
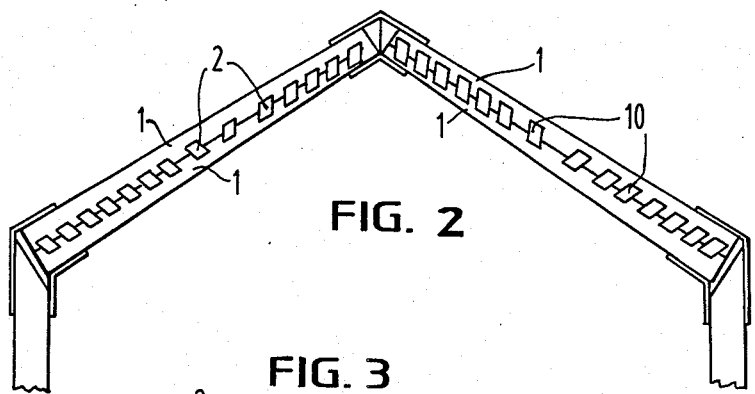
FIG. 2
FIG. 3
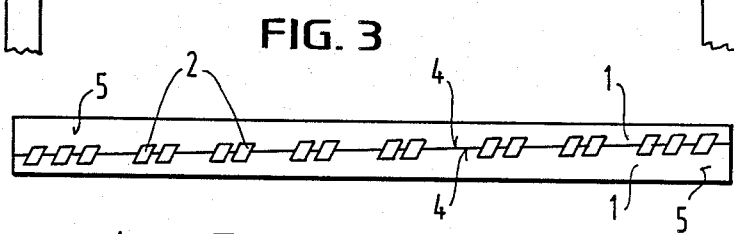
FIG. 4
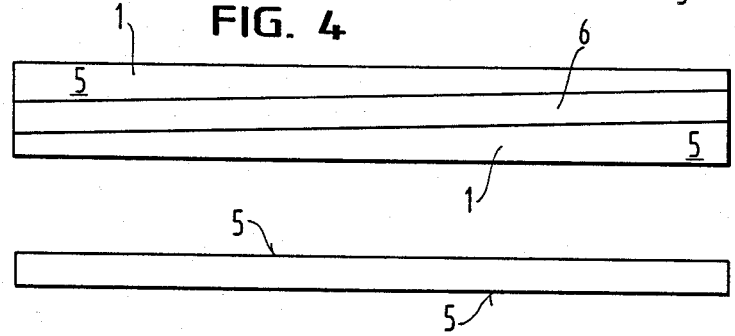
FIG. 5

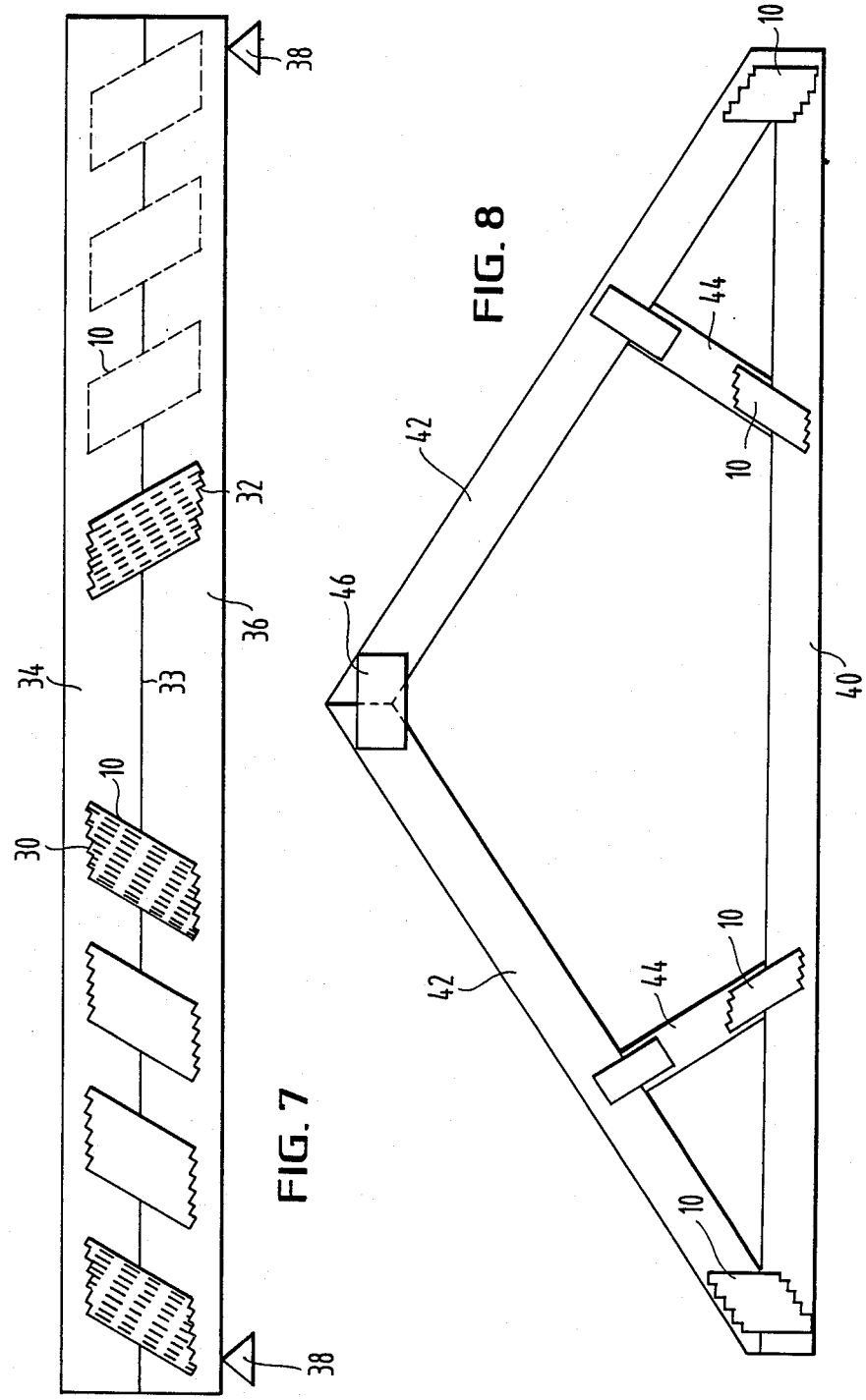

COMPOSITE BEAM

BACKGROUND OF THE INVENTION

The invention involves a composite beam, including edged, round timber sections connected by nail plates.

Existing composite beams of this type consist of rectangular or square prismatic beams trimmed on all sides. Manufacture of these beams starts from the smaller diameter at the top or head of the trunk. This makes the diameter at the base relatively greater, depending on the length of the beam, resulting in an increase in the bearing cross-section at the base. The diameter per running meter can increase or decrease by 1 cm. Due to this taper or conicity, a tree trunk 10 meters long can thus have a diameter differential of about 10 cm between head and base.

The existing nail plates used for joining the beams have been found to be in need of improvement, since it has been shown that vibration and peak loads cause the nails to loosen, thereby reducing the bearing strength of the composite beam.

SUMMARY OF THE INVENTION

A purpose of the present invention is to produce composite beams consisting at least partly of round timber sections which are edged according to the taper of the trunks and joined, depending on static load requirements, with converging or opposing taper, to provide exceptional bearing strength and extended service life.

The present invention resolves this task by edging the round timber sections according to the taper of the trunks and joining them, depending on load requirements, with converging or opposing taper by means of nail plates. These nail plates have punched-out, tongue-shaped nails in parallel rows along the longitudinal edge of the plate. The front and/or back edge of the plates is designed in a stepwise pattern.

An advantage of the invention is to permit exceptionally economical manufacture of composite beams with exceptional bearing capacity. This advantage is firstly based on the use of conically edged beams. This minimizes the amount of timber waste because the beams are edged according to the natural shape of the trunks. These beams therefore provide a greater bearing mass than beams trimmed to a constant diameter.

The advantage of exceptionally high, as well as exceptionally durable, load-bearing capacity is also realized by use of the specially designed nail plates. The rows of nail bases are not parallel to the grain of the beams joined by the nail plates. If these nail plates are placed for example with their lateral edges approximately parallel to the joint or seam between two beams, the rows of nail bases arranged across the nail plate, as well as the rows of nail bases arranged parallel to the longitudinal sides of the nail plate, will run diagonally to the seam between the two beams. Also, the broad side of each individual, flat nail will be diagonal to the seam. The tacking effect of the row of nails is thus increased, while the risk of the joint loosening upon oscillation or at peak load is significantly reduced.

An additional advantage is that these nail plates have significantly better tacking ability than existing nail plates, because nails are punched out over the entire surface of the plate, thus providing a greater number of nails to achieve the tacking effect. A final advantage to be mentined is that these nail plates themselves can be manufactured most economically, further enhancing the production of the entire composite beam.

One type of construction type according to the invention is a composite beam made of round timber sections, edged on four sides to form frustrum-shaped beams with a rectangular or square cross-section. These beams are joined along their taper, for example with converging conicity in the same direction.

Another construction type according to the present invention involves composite beams made of round timber sections which are edged according to the conicity of the trunk on those sides intended as matching surfaces where the beams being joined contact each other, while by contrast the sides used for the nail plates are trimmed to form surfaces parallel to each other. This allows the round timber sections to be joined with opposing taper, that is, with the head of one section or beam lying against the base of the other.

The composite beam may consist of conically edged round timber sections joined to a prismatic beam having a rectangular or square cross-section and a uniform width for example to make equal the distance between opposing parallel surfaces of the round timber sections.

The front and rear edges of the nail plate can each be designed to form a series of rising or falling steps, with each step having edges extending in parallel in between the longitudinal edges of the nail plate. This design has the advantage of giving the nail plate a rhomboid external form, which has an inherently advantageous shape.

In another design variant of the invention, the relative distance between steps at the front edge of the nail plate is equal in each case to the relative distance between steps at the rear edge. This design variant firstly has the advantage of permitting economical production of the nail plate, because the stepped cuts in each case can be made with the same tool. An additional advantage is that these nail plates can be placed directly end-to-end, without any gap therebetween, when desirable or necessary.

A further development according to the invention is to alternate the direction of laterally adjoining punch-outs in the nail plate. This improvement has the advantage of maintaining maximum stability in the nail plate itself.

it is expedient to provide a distance greater than the length of the punch hole, between the base points of a transverse row of nails being punched out between the lateral edges of the plate, and the opposite row of nail base points. This invention design also contributes to maintaining maximum stability in the nail plate. An additional advantage is thereby maintained, permitting the nail plate to be made of relatively thin sheet metal, once again reducing the cost of the nail plates.

An equal distance is in each case maintained between rows of punch-outs aligned in the same direction.

The base points of a given row of punch-outs is always placed between two rows of base points aligned in the opposite directions. This maximizes the number of nails on the nail plate surface, while simultaneously maintaining maximum stability.

BRIEF DESCRIPTION OF THE DRAWINGS

FIG . 1 shows a front view of the shape of a round timber as it is to be edged to form a timber section.

FIG. 2 shows a lateral view of roof rafters made of conically edged round timber sections.

FIG. 3 shows the shape of a composite beam which has a rectangular cross-section.

FIG. 4 shows a simplified representation of another composite beam design which has a rectangular cross-section.

FIG. 5 shows a simplified top view of the designs of FIGS. 3 and 4.

FIG. 7 shows a composite beam made of two individual beams joined with nail plates according to the present invention.

FIG. 8 shows a roof rafter assembly using the nail plates according to the invention.

Figure 6:
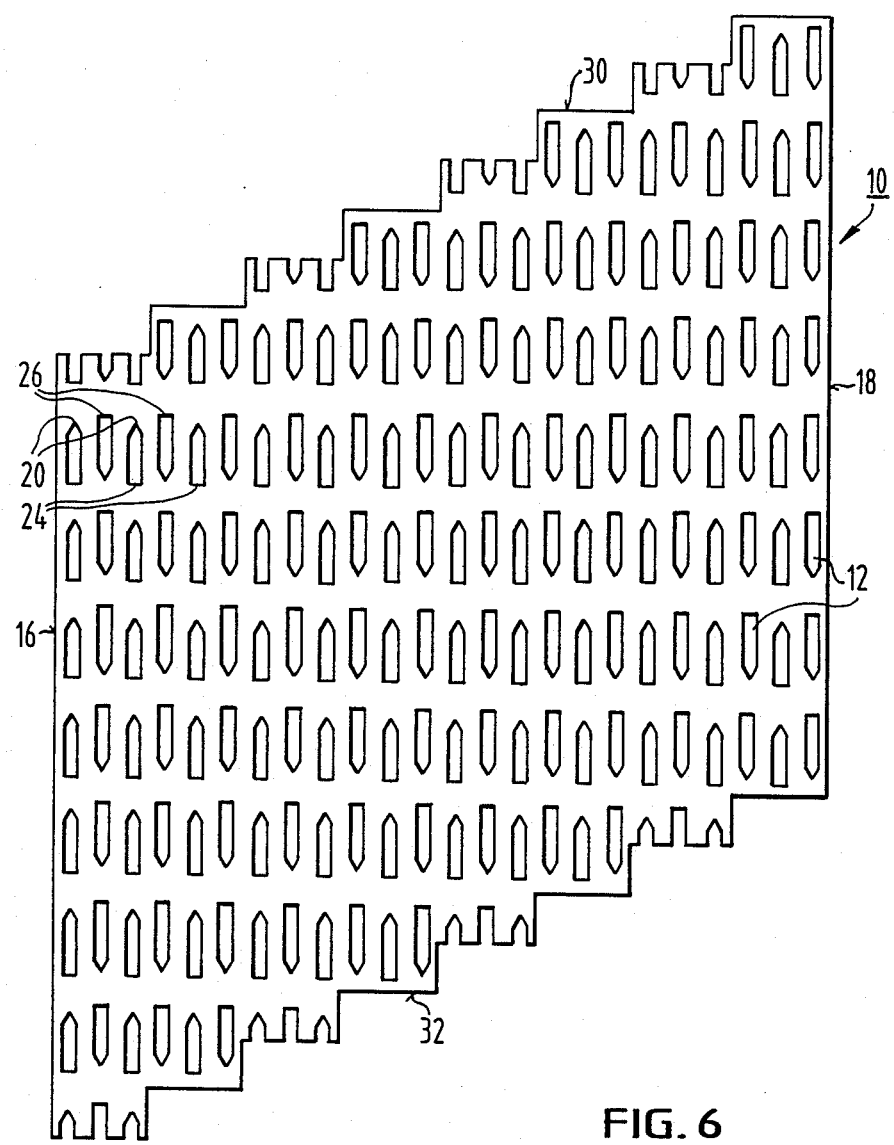
FIG. 6 shows a top view of a nail plate according to the invention, having tongue-shaped nails punched out but mostly not yet bent over.

DESCRIPTION OF PREFERRED EMBODIMENTS:

The invention is described in detail for the following embodiments, with reference to the drawings.

FIG. 1 shows a tree trunk 3, edged on four sides according to its conical or tapered contour to form a timber 1. Sections of such a timber with rounded edges, which attains a frustrum shape, can be joined by means of nail plates 2 to form a supporting beam unit as shown in FIG. 2. The most tapered or top ends are aligned according to the load requirements of a roof construction.

In the design shown in FIG. 3, the composite beam has a uniform cross-section. Here the edged, round timber beams 1 are positioned with opposing conicity, the tapered top end of one beam being placed against the base end of the other, and the tapering contact areas 4 are joined by means of nail plates 10. The surfaces 5 held by the nail plates 10 are edged to be parallel to each other, thus providing the rectangular cross-section.

FIG. 4 shows a composite beam (nail plates 10 not shown) made of edged, round timbers 1 arranged with top ends opposed, as shown in FIG. 3. Between these round timber sections 1, a prismatic beam 6 of rectangular or square cross-section has been placed. The width of this beam 6 establishes the distance between the facing parallel surfaces of the edged, round timber sections 1. FIG. 5 provides a top view of a composite beam as described above for FIGS. 3 and 4 (not showing the nail plates 10).

FIG. 6 shows a top view of a nail plate 10, as described in the invention. The punch-outs 12 are parallel to the longitudinal edges 16 and 18 of the plate 10, and bent out to form nails. Every row of punch-outs 12 is parallel relative to the lateral edges 16 and 18, while the direction of alignment alternates with each row. The punch-outs are laid out so that the points 20 of a given row of punch-outs fall between two punch-outs aligned in the opposite direction. However, a sufficient distance is maintained between the bases 24 of punch-outs in alternating rows and the bases 26 of the oppositely oriented punch-outs, to ensure that the head or points 20 do not extend between the pairs of similarly-oriented bases. This ensures that the area between pairs of base points in alternate rows remains intact from any punch-out. The nail plate is thus given exceptionally high stability.

The front edge 30 and rear edge 32 of the nail plate have a stepped design, extending from bottom left to upper right. This design of the invention has the desired effect of giving the nail plate 10 an approximately rhomboid external form.

FIG. 7 illustrates a composite beam consisting of two beams 34 and 36, joined by the nail plates 10 according to the invention. Wedges 38 show two supports on which the two ends of the composite beam are resting.

As shown in FIG. 7, the nail plates 10 of the invention are nailed into the two beams in such a way that the stepped front and rear edges 30 and 32 of the nail plates are aligned approximately parallel to the seam 33 between the two connected beams 34 and 36. By this arrangement, the rows of nails parallel to the longitudinal sides 16 and 18 of the nail plate run diagonally to the seam 33. In this way an exceptionally strong tacking effect is achieved.

As is furthermore evident from both FIGS. 6 and 7, the total surface area of the nail plate 10 is available for the application of nails. This provides the composite beam with exceptionally good tacking effect.

FIG. 8 shows a roof rafter construction using a joist 40 and two rafters 42 as well as two diagonal supports 44. The joist 40 and rafters 42 are joined by means of the nail plates 10 of the present invention. The joist 40 is also tightly joined to the diagonal supports 44 using the described nail plates 10. As shown in this diagram, the nail plates 10 of the invention can also be used together with other nail plates 46 for the purpose of such composite constructions.

The present invention allows for a number of modifications in nail plate designs and numerous advantageous applications, as would be apparent to a skilled worker in the art in possession of the present disclosure.

What is claimed is:

1. A composite beam, comprising
a pair of timber sections, each said timber section being formed to have a plurality of flat surfaces from a respective tree trunk having a conical contour and a corresponding grain, at least two first ones of said flat surfaces of a first one of said timber sections and at least one first one of said flat surfaces of the second timber section being formed approximately parallel to respective lines along the respective conical contour on respective sides of the respective tree trunk, wherein two further ones of said flat surfaces of each said timber section oppose each other at least roughly in parallel, and said two opposing surfaces of said first timber section are respectively effectively coplanar with said two opposing ones of said flat surfaces of said second timber section, and
a plurality of nail plates joining said pair of timber sections, each said nail plate being planar in form with an approximately rhomboid shape defined by a pair of effectively parallel longitudinal edges, a front edge and a rear edge, said front and rear edges being effectively parallel to each other and oriented diagonally with respect to said longitudinal edges, each said nail plate comprising nails formed by continuous rows of tongue-shaped punch-outs in the nail plates, each said punch-out in its lengthwise direction and said rows of said punch-outs of the nail plate being aligned in parallel to said longitudinal edges, each said nail extending perpendicularly to said planar form, each said continuous row extending from said front edge to said rear edge of the nail plate,
wherein:
(1) said nail plates are distributed in a direction along said two coplanar, opposing flat surfaces of said timber sections to fasten said timber sections together, with said first flat surface of said second timber section opposing a respective one of said two first flat surfaces of said first timber section;

(2) each said nail plate has at least one of said front and rear edges thereof located entirely on at least one respective one of said two timber sections, with no more than one of said front and rear edges on any one of said timber sections;

(3) each said continuous row of punch-outs of each said nail plate extends at least diagonally to and across at least one respective seam of said composite beam defined at least by the respective one of said first flat surfaces of the respective timber section on which said at least one of said front and rear edges is located;

(4) each said row of each said nail plate having a plurality of said nails in the respective timber section on which said at least one of said front and rear edges is located;

(5) said front and rear edges are approximately parallel to each said seam; and (6) nearest ones of said nails of alternating ones of said rows having all nails thereof aligned in the same direction define columns of said nails which are not parallel with said grain of said timber sections.

2. The beam of claim 1, comprising
a prismatic beam between said pair of timber sections, wherein respective ones of said nail plates connect said prismatic beam to said first timber sections, and the other ones of said nail plates connect said prismatic beam to said second timber section, each said nail plate having one of said front and rear edges thereof entirely on said prismatic beam.

3. The beam of claim 1, wherein both said timber sections are aligned with taper corresponding to said conical contours in the same direction.

4. The beam of claim 1, wherein said timber sections are aligned with taper corresponding to said conical contours in opposite directions.

5. The beam of claim 1, each said timber section having four of said flat surfaces on four respective sides, to form a frustrum-shaped timber section with at least a rectangular cross-section.

6. The beam of claim 5, wherein both said timber sections are aligned with taper corresponding to said conical contours in the same direction.

7. The beam of claim 1, wherein said first flat surface of said second timber section and said respective first flat surface of said first timber section are held in contact with each other by said nail plates, each said nail plate having each said front and rear edge thereof entirely on a different one of said pair of timber sections.

8. The beam of claim 7, wherein said timber sections are aligned with taper corresponding to said conical contours in opposite directions.

9. The beam of claim 1, wherein said tongue-shaped punch-outs for each one of said rows of said nails are aligned in the same direction for the row, with said tongue-shaped punch-outs in adjacent ones of said rows being aligned in opposite directions.

10. The beam of claim 9, comprising
each said punch-out having a base end at which the respective nail is attached and a head end, and
said punch-outs having a pattern such that for each corresponding pair of said base ends in two of said rows with the punch-outs aligned in the same direction, separated by one of said rows with the punch-outs aligned in the opposite direction, the respective punch-out aligned in the opposite direction in the separating row does not extend between said corresponding pair of base ends, wherein said nail plate extends continously (1) in a linear direction between each said corresponding pair of base ends, and (2) transversely to said linear direction between each said corresponding pair of base ends.

11. the beam of claim 9, wherein the spacing between adjacent pairs of said rows of nails is a constant.

12. The beam of claim 1, wherein each said front and rear edge has effectively a stepped pattern extending in plural steps between said longitudinal edges, each said step having a lengthwise edge parallel to said longitudinal edges and a transverse edge corresponding to a plurality of said rows of nails, said transverse edges alternating between extending between respective pairs of the punch outs in each row of the corresponding plurality of rows and directly through a respective punch-out in each row of the corresponding plurality of rows.

13. The beam of claim 12, wherein said front and rear edges of each said nail plate extend across respective pluralities of said aligned rows between said longitudinal edges, each said row of each said respective plurality corresponding to a respective one of said steps of said step pattern of each of said front and rear edges.

14. The beam of claim 12, wherein said step patterns of said front and rear edges are identical, with each step having the same width and height.

15. The beam of claim 12, wherein said tongue-shaped punch-outs in each one of said rows are all aligned in a respective direction for that row, and said respective directions for each adjacent pair of said rows are opposing directions.

* * * * *